Sept. 25, 1928.
H. E. LEASH
1,685,366
DEFECTIVE LUMBER REPAIRING MACHINE
Filed May 18, 1927    4 Sheets-Sheet 4
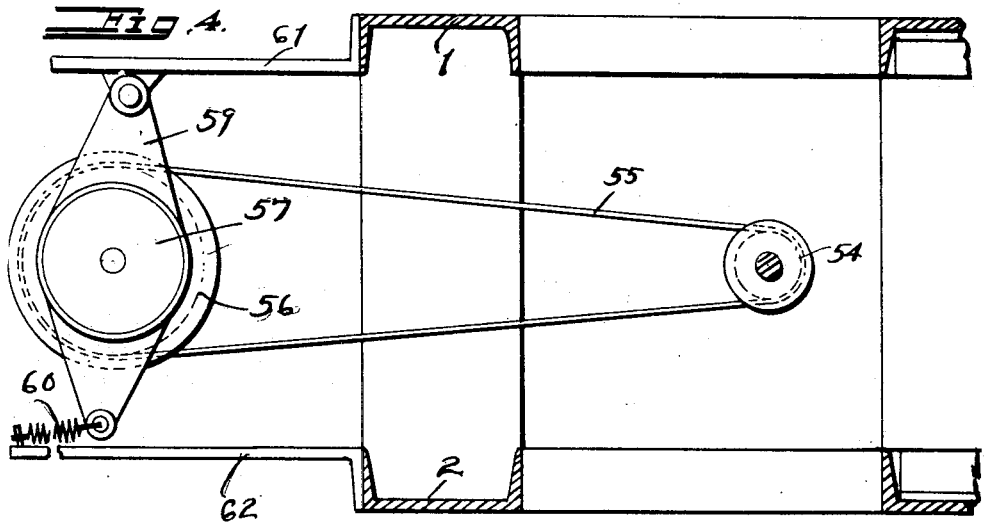
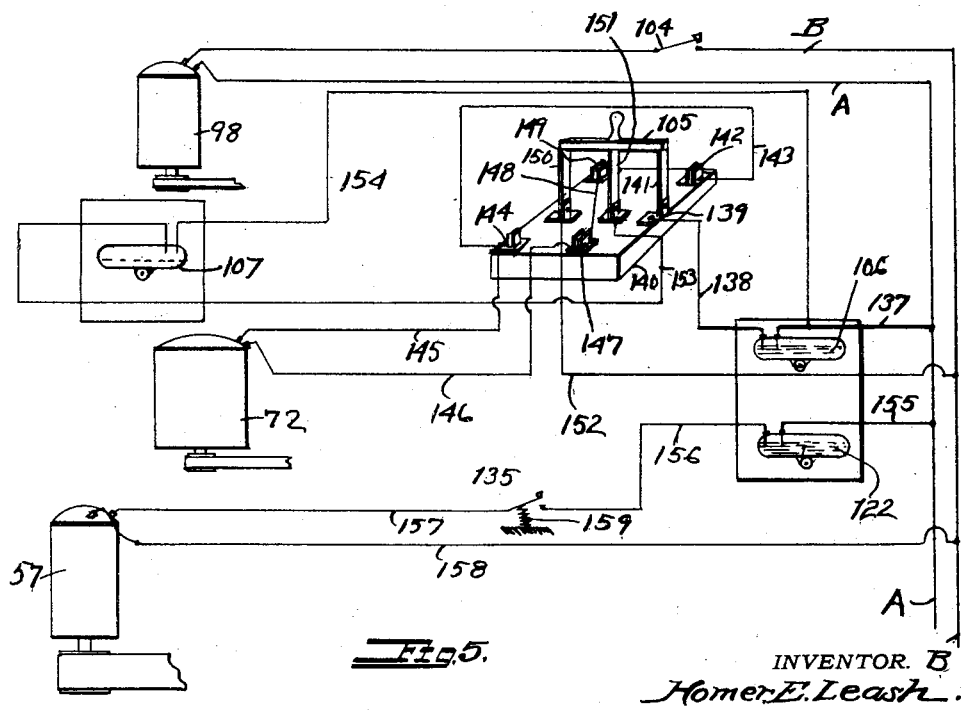
INVENTOR.
Homer E. Leash.
BY
Carlos P. Griffin
ATTORNEY.

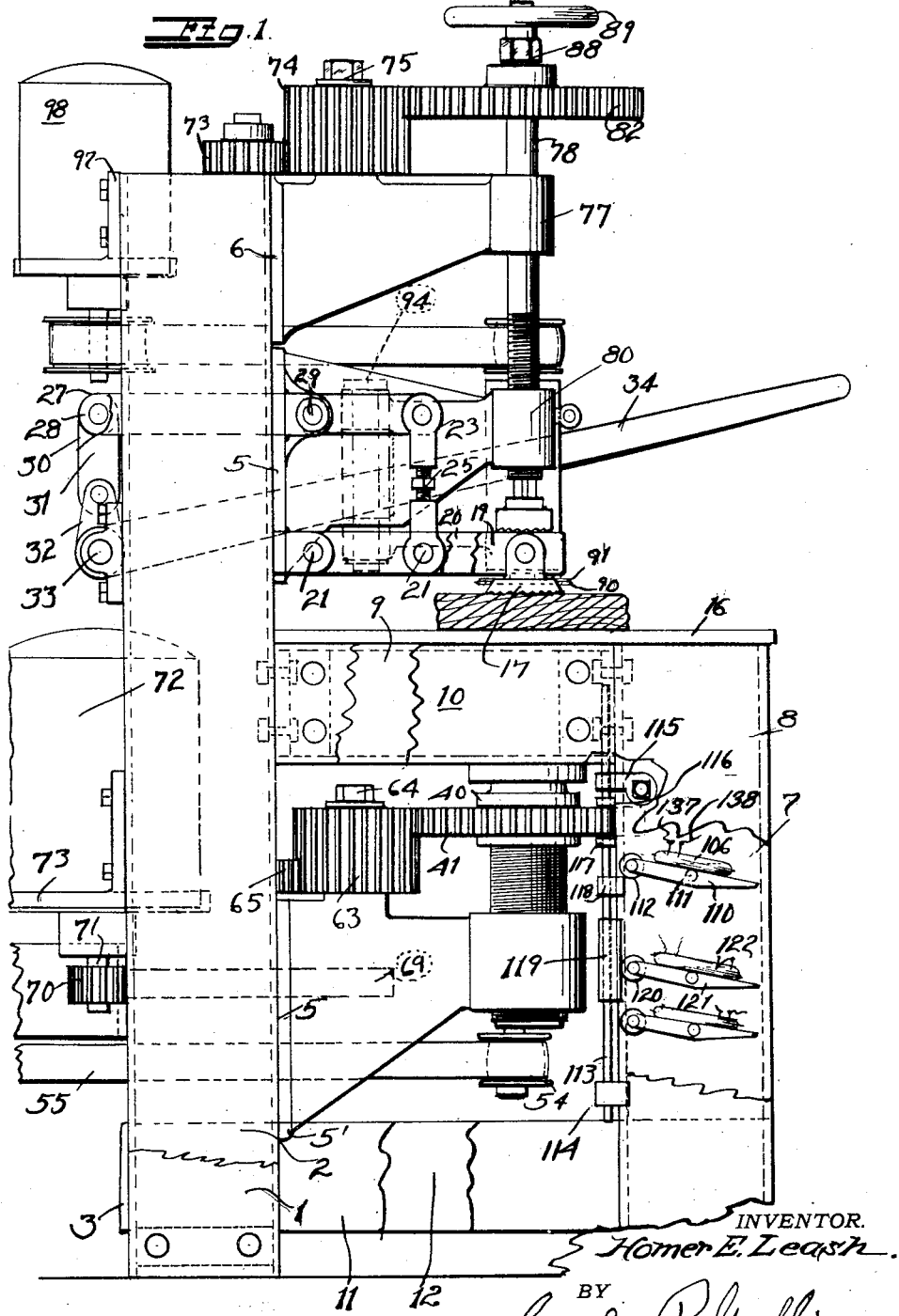

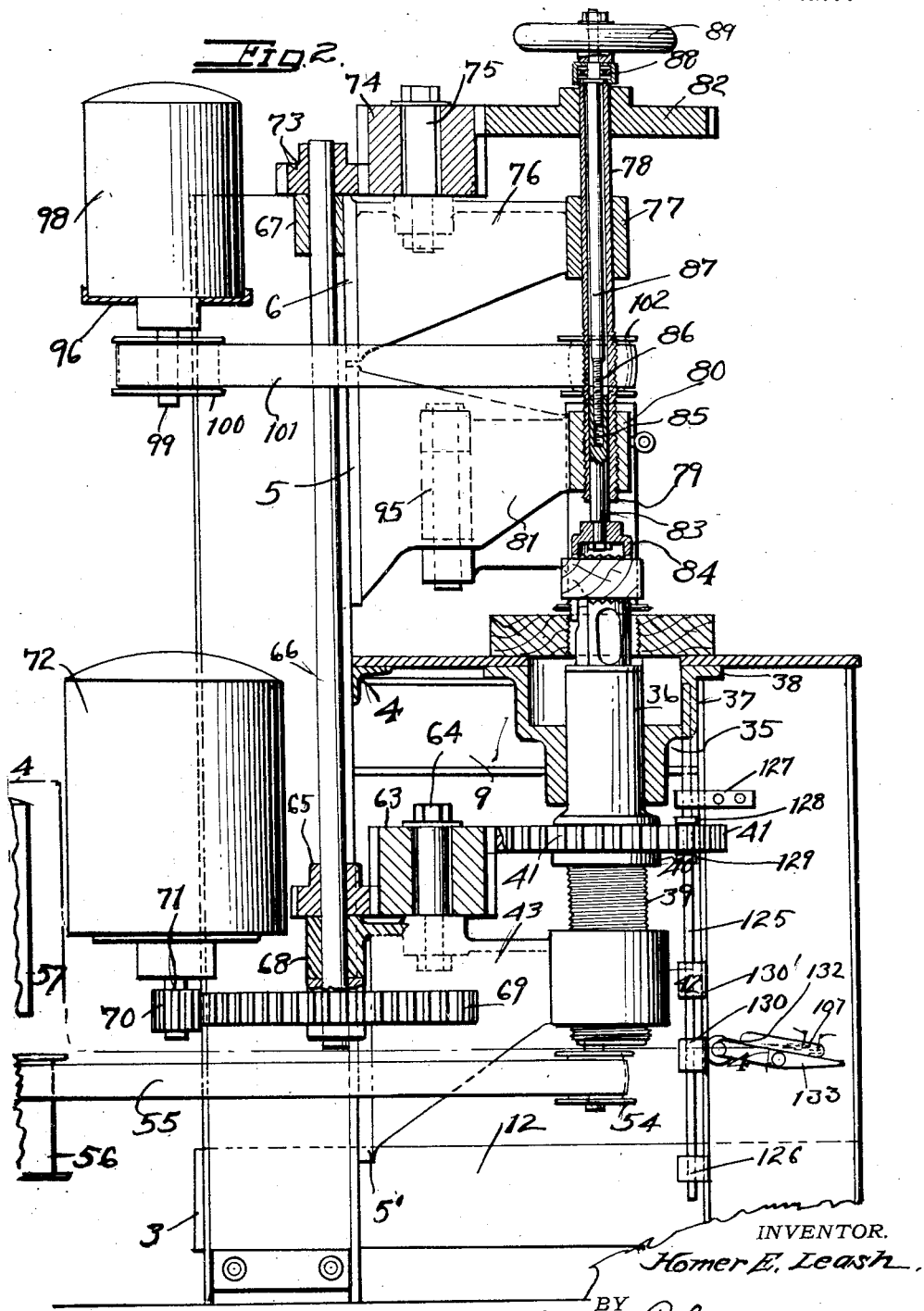

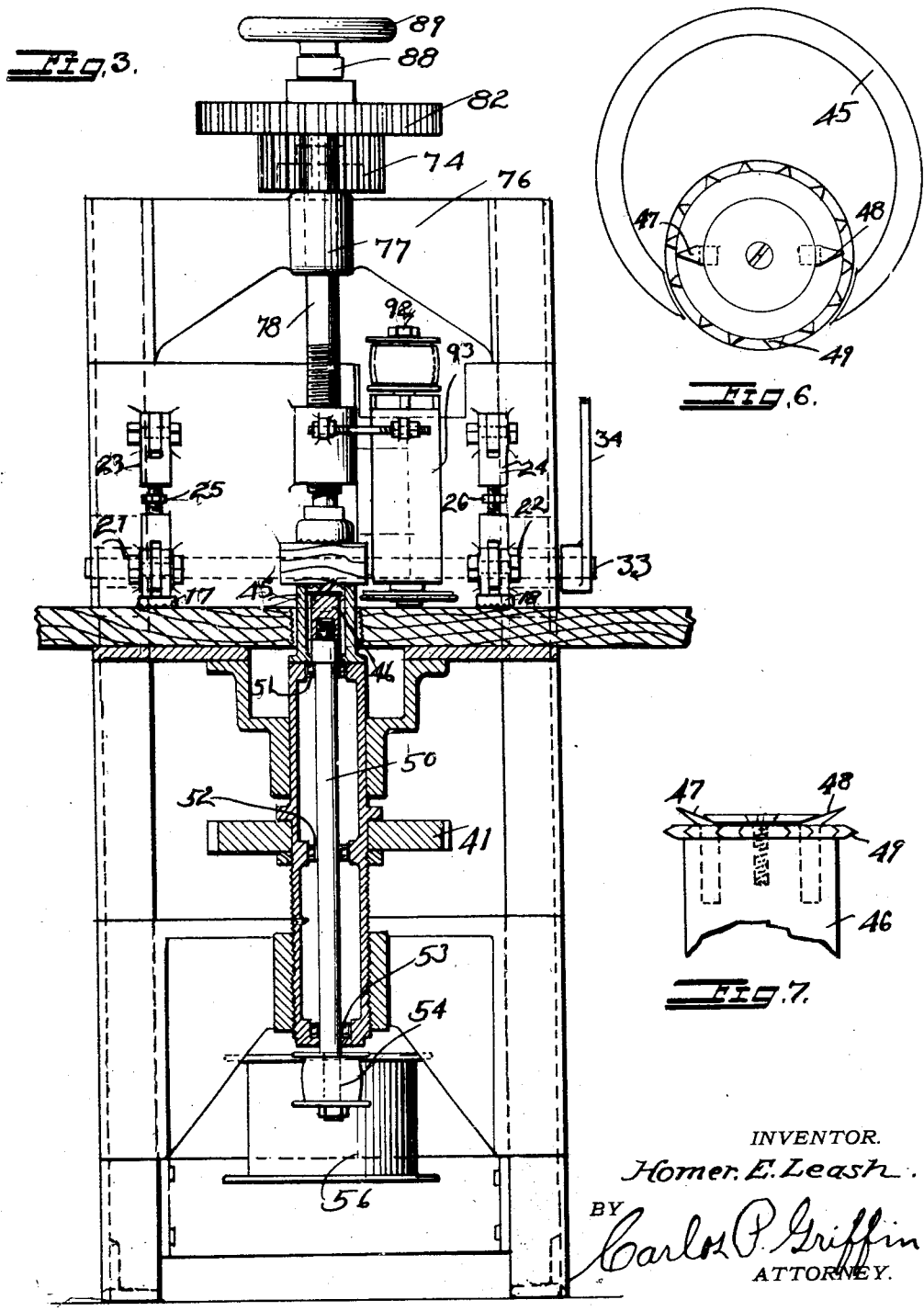

Patented Sept. 25, 1928.

1,685,366

UNITED STATES PATENT OFFICE.

HOMER E. LEASH, OF OAKLAND, CALIFORNIA.

DEFECTIVE LUMBER REPAIRING MACHINE.

Application filed May 18, 1927. Serial No. 192,231.

This machine relates to the repairing of defective lumber, and its object is to fill the defective openings in lumber with a block cut to precisely the right size of good lumber with the grain substantially in alignment with the grain of the block which is filled.

It will be understood by those skilled in the art that a great deal of waste in lumber comes from the fact that the lumber may be filled with knots of odd sizes which prevent the lumber from being cut up into small sizes for box or ship making purposes, and a great deal of lumber is also injured by reason of various defects therein due to the handling of the lumber with cant hooks and other dogs which carry it through the saw mill. Each time one of these dogs is pushed into lumber it produces a defect which for small work, or for any other careful work requires the piece of lumber to be thrown away, unless it is repaired in the manner disclosed in this case.

In the present case a hole is cut in the piece of lumber to be repaired, this hole is at the same time threaded, and as soon as the hole and threaded portion of the hole is completed a block of sound lumber is placed upon a suitable holding device, and the block is turned back into the hole to be left there, the block being oppositely threaded to the hole in the lumber, so that where it is turned back into place and allowed to set for some time it is very difficult to dislodge and makes a very good piece of lumber capable of use for many things.

In the present case there is a holding device both above and below the block of lumber which is being repaired, and one of these holding devices carries a knife which cuts the proper size opening through the piece of lumber, and at the same time threads it for the subsequent reception of the threaded block, a separate saw cutting and threading the new block of lumber which is to be placed in position in the piece of lumber to be repaired.

In the present machine there is a saw which cuts the block the right size to fit into the opening in the piece of new lumber, and this saw at the same time threads the block so that it can be screwed into place and left there.

This machine also provides means whereby the holder for the block can be moved up or down while turning as may be desired without the cutter running. Means is also provided to operate the block holder up with the cutter running, so that as it goes through the piece of lumber to be repaired, it will produce the desired opening therethrough, and will at the same time thread said opening to receive the block to be subsequently screwed into the opening from which the defect has been cut.

Another object of the invention is to provide means whereby the holder will automatically stop on the down movement as soon as the block comes to surface of the board, the gauge point being the underside of the board being repaired.

Another object of the invention is to provide an automatic stop when the cutter gets through the block on its first movement upwardly, the object being to prevent the cutter from being interfered with by the cutter which subsequently operates upon the irregular new block to shape it to fit the threaded hole through the piece of lumber to be repaired.

Another object of the invention is to provide a suitable holder for the board being repaired.

Another object of the invention is to provide a saw and cutter which will be capable of cutting an opening through the board to be repaired and which will at the same time thread said opening so that when the fresh block is to be inserted in place therein it will be held in such place with considerable security.

Another object of the invention is to provide a block cutter which shall have two saws; one to cut, and one to thread the block so that it will be tightly held in place when driven thereinto by the operation of the cutters.

Another object of the invention is to provide a double saw cutter for the block to be inserted in the wood piece to be repaired. This double cutter is made up of a saw which cuts a cylindrical surface, and another saw which cuts a helix upon the cylinder.

Another object of the invention is to provide the apparatus with a gear drive to maintain a given relation of the cutter spindle and the holder spindle when a block is to be screwed into the threaded hole produced in the piece of lumber.

Another object of the invention is to provide a mercury tube switch for the rapid stopping of the electric motors, as well as to provide rapid stops for the machine when the block is screwed into the piece of lumber to be renewed, or when it is to be slightly moved to bring the two pieces into alignment.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a side elevation of the complete apparatus showing the manner of stopping the motor at the end of the movement of the cutter.

Figure 2 is a vertical sectional view through the complete apparatus showing a number of parts in section for purpose of illustration.

Figure 3 is a vertical sectional view of the complete apparatus looking from the front of the machine, the plane of section being transverse to the plane of Figure 1.

Figure 4 is a plan view of the lower portion of the machine illustrating the operation of the motor which drives the cutter, the dotted circle indicating the path of the cutter as it travels around and makes the threaded opening into which the new block is to be inserted.

Figure 5 is a diagrammatic view of the electrical connections to the different motors.

Figure 6 is an enlarged plan view of the spindle shell and rotary cutter, and

Figure 7 is a side elevation of the rotary cutter partly broken away showing the saw and boring cutters.

The present machine has two channel bars 1 and 2 at the back which channel bars are connected together by suitable cross members 3, 4, and the bases 5, 5' and 6 which have brackets to hold certain parts of the apparatus hereafter to be described.

At the front of the machine there are two similar heavy channel bars 7 and 8 which are connected to the two back channel bars by means of two short channel bar pieces 9 and 10 and by two flat plates 11 and 12 at the bottom of the machine. Connected to the angle bar 4 and extending over the top of the two channels 9 and 10, as well as over the top of the ends of the two channels 7 and 8, is a heavy plate 16 which forms a working table. On the working table the pieces of lumber to be improved or repaired are clamped by means of the two clamps 17 and 18. The two clamps 17 and 18 are respectively supported by two bars 19 and 20 which are pivotally mounted on the base 5 at 21 and 22. These two arms 19 and 20 are supported by the adjustable links 23 and 24; said links having turn buckle nuts at 25 and 26 to lengthen them or shorten them as may be required.

The links 23 and 24 are in turn supported at their upper ends by means of two levers 27, 28 which levers are pivotally mounted in the same axis at 29 on the front of the base casting 5.

At the back of the frame the lever 28 is pivotally connected to a short link 30 while the lever 27 is pivotally connected to a substantially similar short link 31. The links 30 and 31 are each connected to a short lever 32, of which there are two on the back of the frame of the machine rigidly connected to the shaft 33, and said shaft has the operating lever 34.

The adjustment of the two links 23 and 24 is so arranged that the links 30 and 31 will just lock with the lumber tightly held against the table 16, when the lever 34 is pulled down whereby as soon as the workman clamps the piece of lumber upon the table he will have his hands free for other operations.

Substantially in the center of the table plate 16 is a rather large opening through which on the underside of the plate is secured a journal bearing 35, said journal bearing being of such a size as to provide a running fit for the spindle 36, which latter runs at a comparatively slow speed, and rises and falls through said bearing. This journal bearing has a cup shaped flange as indicated at 37 and a horizontally extending flange 38 for securing it to the table. The lower portion of this spindle is threaded as indicated at 39, and a lock nut 40 securely holds a gear 41 in place on the spindle to rotate it. The spindle is also threaded into a hub 42 on the lower bracket 43 which is an extension of the base plate 5. This spindle has a serrated shell-like top 45 which is cut away on one side to allow the operation therethrough of the rotary cutter 46.

This rotary cutter 46 has two boring cutters 47, 48 and it has a saw 49 immediately adjacent the boring cutters to provide the threading of the opening through which the spindle bores.

The cutter 46 is carried by a shaft 50 which shaft is provided with three bearings 51, 52 and 53 inside the spindle 36, and there is a small pulley 54 on the lower end of this shaft. A belt 55 passes around the pulley 56 on the lower end of the shaft of the motor 57, and said belt also passes around the pulley 54 to drive the cutter and saw. It will be seen that the cutter shaft 50 is eccentrically placed with respect to the spindle 36 the object being to provide means whereby the hole may be cut and threaded in one operation as the spindle rises, the cutter itself only cutting substantially one-half the diameter of the hole to be produced, but as it is traveling around on the periphery of the spindle 36 it cuts a hole just twice the actual size of the cutter and threads it at the same time. Since the shaft 50 is eccentric with respect to the spindle 36 it is necessary to provide means for shifting the motor 57 to correspond, and this means is illustrated in the supporting bracket 59 shown in Figure 4. This supporting bracket carries the motor 57 and pulley 56, while a spring 60 holds the belt 55 tight, but allows the spindle 54 to move forward and back at the same time.

The motor is supported from a rearwardly extending arm 61 carried by the channel frame member 1, the spring 60 is held extended by means of a bar 62 carried by the frame member 2.

The gear 63 journalled on the short shaft 64 is as long as the total movement of the spindle 36, the object being to permit that spindle to rise and fall without becoming disengaged with the gear 63, its gear 41 being much narrower than the gear 63. The gear 63 is driven by a gear 65 rigidly connected to the shaft 66 journalled in two bearings 67 and 68 on the back of the base members 6 and 5' respectively.

The shaft 66 has a gear 69 on its lower end which gear is in mesh with a gear 70 on the lower end of the motor shaft 71 of the motor 72. The motor 72 is carried by a bracket 73 bolted on the back end of the two members 1 and 2. At its upper end the shaft 66 has a gear 73 thereon, said gear being in mesh with a gear 74 having a long face substantially the same as the gear 63. This gear is journalled on a vertical stud 75 in the bracket 76, which bracket also has a bearing 77 through which the holder spindle 78 slides. The holder spindle 78 is threaded at its lower portion as indicated at 79 and it passes through a bearing 80 which is similarly threaded on the bracket 81 secured to the base member 5, and which projects over the table 16. This spindle is driven by means of the gear 82, which is rigidly connected to the spindle 78 at its upper end.

Inside the spindle 78 there is a short shaft 83 with a serrated holder 84 loosely mounted on its lower end. This shaft is also threaded at 85 to receive the lower end 86 of the adjusting shaft 87, said adjusting shaft having a bearing 88 at its upper end adjacent the top of the hollow spindle 78 to enable the position of the holder 84 to be adjusted with respect to the holder on the top of the spindle 36. A small hand wheel 89 enables the position of the holder 84 to be adjusted at will.

In order to provide for the turning of the block and for its threading as it is to be inserted in the hole cut through the piece of lumber, there are two saws 90, 91 on the lower end of a spindle 92. The saw 90 cuts the thread and the saw 91 has its teeth faced cylindrically so that it will cut the block cylindrically.

The spindle 92 is carried by an arm 93 which has a suitable journal box inside the same, and said arm is pivotally mounted on a pin 94 mounted in a lug 95 on the side of the forwardly projecting arm 81. At the back and top of the posts 1 and 2 there is a plate 96 which has a flange 97 for connection with each of said posts, one at each side, for the support of the motor 98. This motor has the shaft 99 carrying the pulley 100, and a belt 101 passes around that pulley and around the pulley 102 on the upper end of the saw shaft 92.

Inasmuch as it is necessary for the holder 45 on the top of the spindle 36 to come to a very accurate position with respect to the two saws 90 and 91, and to instantly stop both on the up movement and on the down movement to first prevent the saws from striking the cutter and second to bring the block of wood absolutely flush with the bottom of the piece of lumber being improved, electrical means are provided for starting and stopping the apparatus as shown in the diagrammatic view Figure 5, the several motors receive current from the main line wires A and B Figure 5, an ordinary form of knife switch 104 being used to connect the motor 98 with the current, and since this motor may run all the time there is no particular need to have any automatic control with respect to its circuit.

The motor 72 operates the spindle 36 and it is arranged to be automatically stopped both on its up movement, and upon its down movement, since it must not push the spindle too high, nor must it turn the spindle too low to cause the blocks to project from the piece of lumber being treated. This motor is operated by, and controlled by the knife switch 105, the automatic cut-out 106, and the automatic cut-out 107. The automatic cut-out 106 consists of a sealed tube into which two connecting wires 137, 138 are sealed at one end, and this tube is mounted upon a pivoted piece of fiber 110, said fiber being pivotally connected to the channel bar 7 carrying the same at 111, and it has a small wheel 112 which contacts with the slide. The controlling slide 113 consists of a bar vertically slidable in two bearings 114, 115 mounted on the frame post 7. This slide is rectangular so that it cannot rotate in the bearings 114 and 115, and it has two washers 116, 117 which cause it to travel up and down with the gear wheel 41. This slide also carries two blocks 118, 119, one of which contacts with the small roller 112 on the fiber block 110, while the other 119 contacts with the small roller 120 on the fiber block 121 carrying the automatic contact breaker tube 122, which tube is used in connection with the cutter circuit.

Mounted on the inside of the post 8 there is a slide 125 substantially the same as the slide 113, it is carried by two bearings 126 and 127 whch prevent it from turning the same as the slide 113. This slide also has two washers 128, 129 thereon which are raised and lowered with the slide by the gear 41 the same as is the slide 113. The slide 125 also has a block 130 near the lower bearing, rigidly secured thereto which operates the automatic cut out 107. Above the block 130 is a block 130' mounted on the slide 125, and it bears upon a roller 132 which is carried by the pivotally mounted fiber block 133.

This fiber block 133 supports the automatic cut-out 107 which is substantially as the cut-out 106 except that the connecting wires are sealed into the tube in the opposite ends as shown in Figure 5. The result of the construction of the tube and slide in the cases just mentioned is that when the wheel 41 is rising it will continue to rise until the two blocks 118, 119 strike their respective rollers 112 and 120, whereupon they will tilt the mercury inside the tube 122, 106 away from the connecting wires and thereby stop the motor regardless of the condition of the switch 105 or the spring switch 135. On the down stroke the motor 72 will be operated by reversing the position of the switch 105 in which event the circuit will be made through the automatic circuit breaker 107 and this movement will continue until the block 133 is tilted down by the block 135 whereupon the movement of the motor 72 will be stopped regardless of the position of the switch 105.

On further examining the diagram, Figure 5 it will be seen that there is a circuit wire 137 extending from the main line wire A to the circuit breaker tube 106. Another wire 138 extends to the outside center contact 139 on an insulated block 140. This contact has the knife 141 which is capable of connecting with the contact 142 on the end of the block 140, and from which a wire 143 extends to the contact 144 on the opposite corner of this block. From this contact a wire 145 extends to the motor 72, and an the other side a wire 146 extends to the contact 147 on the end of the block 140. This contact has a wire 148 connecting it with the contact 149 on the opposite end of the block, and there are two switch contact blades 150, 151 for connecting these contacts.

The switch blade 150 is connected with the main line wire B by means of the wire 152, while the switch blade 151 is connected with the circuit breaker 107 by means of the wire 153; a wire 154 leading from the opposite pole of said circuit breaker back to the wire 137.

The motor 57 is only operated when the spindle 36 is traveling up, and this is stopped as soon as the spindle reaches the desired elevation by the block 119 shifting the circuit breaker 122 to the position in which the mercury therein does not connect its two circuit wires. This motor is operated by means of the wires 155 extending from the circuit wire A to the circuit breaker 122, the wire 156 extending from the circuit breaker to the switch 135, the wire 157 extending from the switch 135 to the motor, and the wire 158 extending from the motor back to the main line wire B.

The switch 135 has a stiff spring 159 interposed between it and its base in order to prevent it from being closed except when it is actually in the mind of the operator to close it and hold it closed, but it will not continue to hold the circuit closed because when the spindle 36 has reached the top of its proper travel it will cause the circuit breaker 122 to break the circuit, and then, of course, when the operator lets go of the knife 135 it will also break the circuit at that point.

In actual practice it has been found necessary to apply special means for stopping the motors A and B instantly, but that means is well known in the art and forms no part of the present invention so is not illustrated here.

The operation of the machine is as follows: The workman places the board with the knot to be removed and filled upon the table 16 and secures it there by pressing down upon the lever 34 until it is locked in position. At this time the motor 98 is started by means of the switch 104 and it is allowed to run steadily. The workman then starts the motors 57 and 72 by closing the switch 135 and by engaging the knife contact 141, 150 with the two contacts 142 and 149. The motor 57 will, of course, rotate the shaft 50 at a very rapid rate of speed, about three to five thousand revolutions per minute. At this same time the motor 72 will rotate the spindle 36 slowly and it will travel on its threads 139 upwardly through the hole produced by the two cutters 47 and 48 in the piece of lumber secured on the top of the table 16. As the spindle 36 rotates it will carry the shaft 50 eccentrically around with it, and in this way will cut the hole through the piece of lumber twice as large as the total diameter of the point of the saws 47 and 48, and at the same time the saw 49 will thread the opening. The automatic circuit breaker 122 is arranged with respect to the block 119 so that the latter will lift it and stop the motor 57 just as soon as the points of the cutters 47 and 48 have passed through the piece of lumber on the table 16, and very shortly thereafter the block 118 will tilt the circuit breaker 106 so that it will stop the motor 72. The workman will then, of course, take his hand off the spring contact maker 135 and will at the same time lift the knife switch 141 out of engagement with the contact 142 and he will then place the block B on the top of the serrated shell top 45, raising the holder 84 by turning the hand wheel 89 to permit the placing of the block. This block is just over the top of the two saws 90—91 when it is clamped in place, and as soon as it is clamped in place the workman will close the knife switch 150, 151 on its two contacts 144, 147 with the result that the spindle 36 and its holder, together with the holder 84 will be turned slowly downwardly into the piece of lumber to be improved which is clamped to the table 16. At the same time the block will have its irregular portion cut away, and it will be threaded cylindrically by the saws 90, 91 to fit the openings in the piece of lumber on the table 16, and as soon as the bottom of the block reaches the bottom of the piece of lumber on the table, the block 130 on the slide 125 will tilt the circuit breaker downwardly from the position shown in Figure 2 to break its contact, and thereby stop the motor 72. At this time the two circuit breakers 106, 122 will have been tilted back to their normal contacting position, and if the block has been pushed through the piece of lumber so that the grain does not exactly align with the grain of the piece of lumber, the workman can jog it back by pushing the knife switch 141 into contact with the plate 142 for an instant.

It is to be noted that the spindle 36 and the spindle 78 carry threads of exactly the same pitch, so that as the spindle 36 rises or falls, the spindle 78 rises or falls in exactly the same rate.

Having thus described my invention, what I desire to secure by Letters Patent of the United States is as follows, but modifications may be made in carrying out the invention as shown in the drawings and in the above particularly described form thereof within the purview of the annexed claims.

1. A machine of the class described comprising a work table, means to secure a piece of lumber thereto, a revoluble spindle, a cutter spindle carried thereby eccentrically, means to rotate said spindles independently, means to cause the first spindle to rise with the cutter spindle, means to stop both spindles when they have passed through the piece of lumber on the table, means to hold a block on the first spindle, means to cut and thread the block to fit the hole in the lumber, and means to reversely rotate the spindle and block into the hole in the piece of lumber.

2. A machine for improving lumber comprising a work table, means to secure a piece of lumber thereon, a revoluble spindle, a cutter spindle carried thereby eccentrically, a holder spindle, means to rotate the revoluble and holder spindles in unison, and means to cause each of said spindles to rise and to fall at the same time.

3. A machine for improving lumber comprising a work table, means to secure a piece of lumber thereon, a revoluble threaded spindle, a cutter eccentrically carried thereby and projecting from the top of the same, means to rotate the spindle and cutter independently, a holder spindle, means to cause it to rotate in unison with the revoluble spindle, and means to cause the holder spindle and revoluble spindle to rise and fall simultaneously.

4. A machine of the class described for improving lumber comprising a work table, means to secure a piece of lumber thereto, a revoluble vertically movable spindle, a cutter spindle carried thereby eccentrically, means to rotate each of said spindles independently, means to cause the first spindle to rise with the cutter spindle, a holder spindle adapted to secure a block of wood on the top of the first spindle, and means to cause the holder spindle and the first spindle to rise and fall simultaneously.

5. A machine of the class described for improving lumber comprising a work table, means to secure a piece of lumber thereon, a revoluble spindle, a cutter spindle carried thereby eccentrically adapted to cut and thread a hole in said piece of lumber, means to rotate said spindles independently, means to stop both of said spindles as soon as they have passed through the piece of lumber, a holder spindle, means to cause the holder spindle and the first spindle to rise and fall simultaneously, and an adjusting screw whereby the holder spindle may be caused to secure a block of wood to the first spindle.

6. A machine of the class described for improving lumber comprising a work table, means to secure a piece of lumber thereon, a revoluble spindle, a cutter spindle carried thereby eccentrically, means to rotate said spindles independently, means to cause the first spindle to rise with the cutter spindle, and produce a threaded hole in the piece of lumber on the work table, means to stop both of said spindles when they have passed through the piece of lumber on the table, a holder spindle, means to cause the holder spindle to secure a block on the top of the first spindle, means to cut and thread said block to fit the hole produced in the piece of lumber, and means to rotate the holder and first spindle reversely to place the threaded block in the opening in the stick of lumber.

7. A machine for improving defective lumber comprising a work table, means to secure a piece of lumber thereon, a revoluble spindle, a cutter spindle carried thereby to cut and thread a hole in said piece of lumber, means to rotate said spindles independently, means to cause the first spindle to rise with the cutter spindle, means to stop both spindles when they have passed through the piece of lumber, means to reversely rotate the first spindle to carry a threaded block into the hole produced in the piece of lumber, and means to stop said spindle as soon as the block is even with the bottom of the piece of lumber on the work table.

8. A machine for improving defective lumber comprising a work table, means to secure a stick of lumber thereon, a revoluble spindle, a cutter carried thereby adapted to produce an opening in the piece of lumber threaded to receive a threaded block, means to cause the spindle to rise through the stick of lumber, a holder spindle, means to rotate the holder spindle simultaneously with the first spindle, means to secure a block by means of the holder spindle to the first spindle, means to cut and thread said block to fit the hole in the piece of lumber, and means to stop the rotation of the block when its lower side becomes flush with the lower side of the piece of lumber into which it is being inserted.

In testimony whereof I have hereunto set my hand this 11 day of May, A. D. 1927.

HOMER E. LEASH.